UNITED STATES PATENT OFFICE.

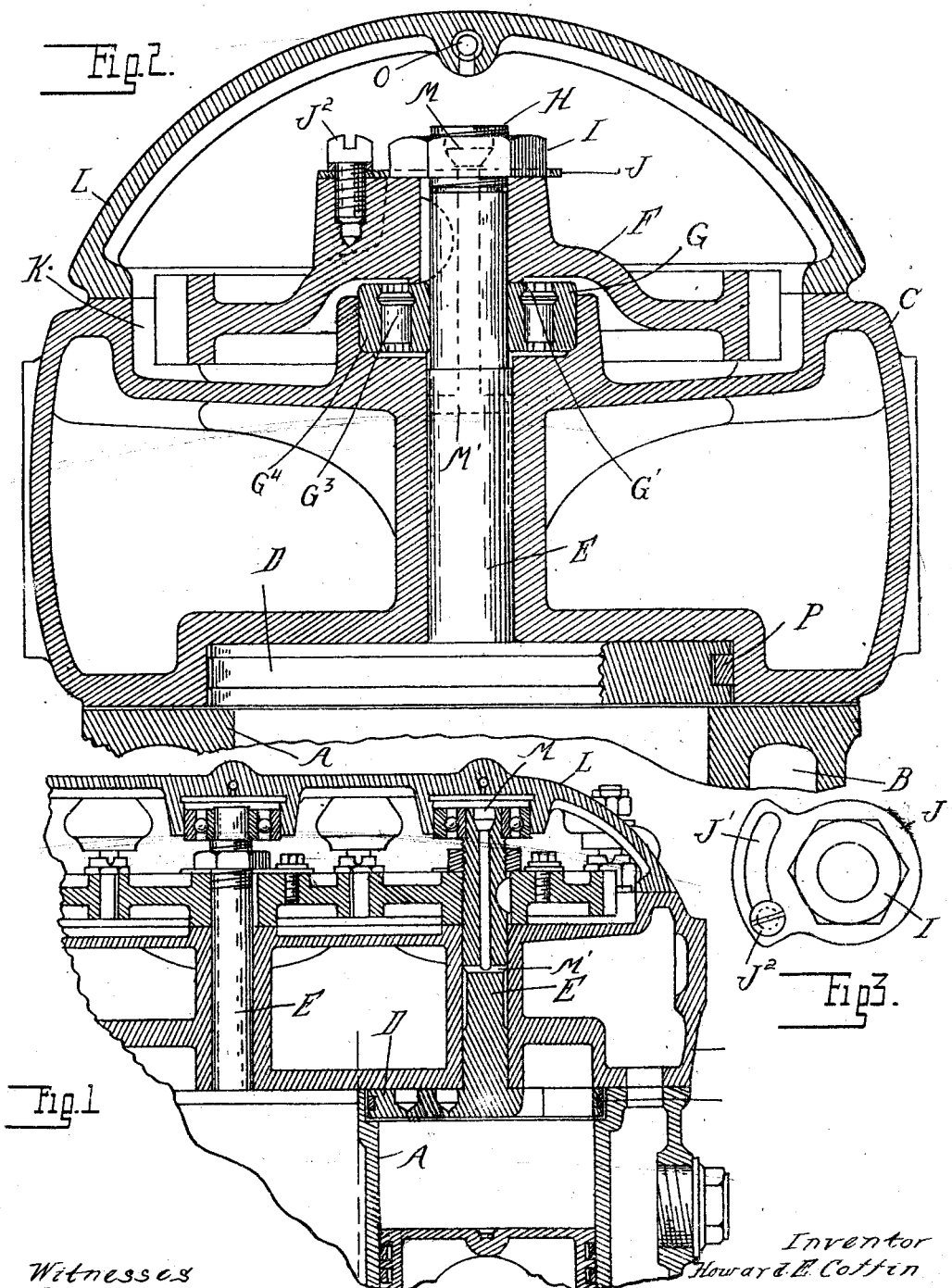

HOWARD E. COFFIN, OF DETROIT, MICHIGAN, ASSIGNOR, BY MESNE ASSIGNMENTS, TO THE DETROIT MOTOR & MACHINE COMPANY, OF DETROIT, MICHIGAN, A CORPORATION OF MICHIGAN.

ENGINE VALVE MECHANISM.

1,136,104.   Specification of Letters Patent.   Patented Apr. 20, 1915.

Application filed October 6, 1911, Serial No. 653,197. Renewed February 6, 1915. Serial No. 6,837.

*To all whom it may concern:*

Be it known that I, HOWARD E. COFFIN, a citizen of the United States of America, residing at Detroit, in the county of Wayne and State of Michigan, have invented certain new and useful Improvements in Engine Valve Mechanism, of which the following is a specification, reference being had therein to the accompanying drawings.

The invention relates to engine valve mechanism of that type in which a rotary disk valve is arranged to control the inlet and exhaust ports of the cylinder and is seated on the inner face of the cylinder head.

It is the object of the invention to overcome certain defects in construction of the type heretofore used, to simplify the construction, and to provide means of adjustment whereby the parts may at all times be maintained in operative condition.

The invention therefore consists in various features of construction as hereinafter set forth.

In the drawings,—Figure 1 is a cross section through the upper portion of one of the engine cylinders showing the arrangement of the valve mechanism therein; Fig. 2 is a longitudinal section therethrough slightly modified; and Fig. 3 is a plan view of the adjustment means for the valves.

My improvements are designed with particular reference to an internal combustion engine in which the rotary disk is alternately subjected to the pressure of explosion and to a pressure less than atmosphere upon the suction stroke. This change in pressure tends to pound the valve upon its seat which is detrimental to the face thereof and also produces noise.

With my improved construction this objection is overcome and the variation in pressure is utilized for a useful function as will be hereinafter described.

A is the engine cylinder provided with the usual surrounding water jacket B.

C is the cylinder head preferably detachable from the cylinder body and D is a ported rotary valve seated on the inner face of the head and controlling valve ports therein. The disk D is preferably of greater diameter than the cylinder bore and is located in a recess preferably formed in the head C.

E is the stem of the valve which passes outward through a journal bearing in the head, and F is a gear wheel secured to the outer end of the stem and forming the driver therefor.

It is very essential to the successful operation of the engine and life of the valve, that the latter should rotate about an axis at all times perpendicular to its seat. It has been found however, that where the valve is driven through the medium of the gear wheel at the outer end of the stem, the thrust of the intermeshing drive gear will cause an unequal rolling of the journal bearing and eventually a tilting of the valve stem and disk. This will cause the peripheral portion of the valve to contact with the seat and will soon wear the face so that the valve will leak.

One of the improved features of my construction is an arrangement by which the valve stem is always held perpendicular to the seat and this is accomplished, first, by the use of a hardened anti-friction bearing for the outer end of the stem the roll of which is too slight to permit angular movement of the axis; second, by arranging this bearing as nearly as possible in direct line with the thrust from the drive gear. In the construction shown, G is an anti-friction bearing shown as a roller bearing and one designed to take care of both the radial and end thrust. This bearing G may be located at the upper end of the stem E, as shown in Fig. 1, but is preferably located as in Fig. 2 in a recess in the upper face of the head C and the gear wheel F has its hub portion off-set so that the gear teeth are in plane of the bearing.

To hold the valve disk to its seat, longitudinal movement of the stem is prevented by the end thrust bearing preferably the hub of the gear wheel F bears against the end of the revoluble race G' of the bearing G, which is grooved to engage enlargements on the rolls $G^3$, said enlargements also engaging corresponding grooves in the non-revoluble race $G^4$. The hub of the gear wheel is longitudinally adjustable upon the stem preferably by threading the upper end of the latter as at H and providing a nut I. This nut is locked by suitable means such as the plate J having a polygonal aperture fitting over the nut, and a segmental slot J' through which a clamping screw $J^2$ passes and engages a threaded aperture in the hub of the gear wheel. Thus when the nut I is adjusted to draw the disk to its seat the plate J will prevent change of adjustment. When however, it is necessary to take up slight wear the screw J² may be loosened and the plate turned through a portion or all of the segment, or if necessary the plate may be changed in its engagement with the hexagonal nut to provide a further adjustment. Thus the disk may be adjusted to its seat to a great nicety and only sufficient clearance is allowed to receive the necessary thickness of oil film.

For multi-cylinder constructions the head C for the several cylinders is preferably integral and all of the valves with their stems and drive gears are mounted thereon. The gears F for the adjacent valves intermesh while at one end of the train there is a drive gear operated by suitable connection with the engine shaft (not shown). The gears are preferably arranged in recesses K in the upper face of the head which forms receptacles for a lubricant, and to keep out dust as well as to protect the gearing, a cap L is arranged to cover the head. The valve is supplied with lubricant preferably by forming an axial oil channel M and a cross channel M' in the stem E. The channel M is alined with an oil conduit O in the cap, thus the supply of lubricant from any suitable source (not shown) may be continuously fed through each of the stems to the bearing face of the valve.

To further insure the tightness of the valve a peripheral packing ring P is preferably arranged thereabout, which as shown, engages a groove in the disk and is pressed by its own tension against the wall of the recess. This will cause the ring to remain stationary during the rotation of the valve and will form a break joint which prevents leakage of gas and escape of oil into the engine cylinder.

In operation, the valve is first adjusted to take up all lost motion between its bearing face and the seat, the clearance remaining being only sufficient for the oil film. During the suction stroke of the engine the valve is drawn from its seat to the limit of its clearance and the oil is also drawn between the valve and its seat to completely fill the space. Upon the compression and explosion strokes the pressure exerted against the valve will tend to squeeze out the oil but a sufficient thickness of film is maintained for purpose of lubrication. Furthermore, the clearance between the valve and its seat is so slight as to avoid any pounding.

The arrangement of the rotary valve D in recesses in the head C prevents danger of injury to the valve during the attachment or detachment of the head, for the reason that there is no projecting part beyond the recess. Furthermore, the mounting of the drive mechanism for the valves upon the head permits of assembling and adjusting the parts while the head is detached.

What I claim as my invention is:

1. The combination with an engine cylinder and the head thereof, of a rotary disk valve seated upon said head, a stem for said valve passing through said head, driving means for said valve engaging the outer end of said stem, and means in substantial lateral alinement with said driving means for maintaining the axis of said stem in constant angular relation to the seat.

2. The combination with an engine cylinder having a ported seat, of a rotary disk valve engaging said seat, a stem for said valve passing centrally through said seat, driving means for said valve engaging said stem, and an anti-friction journal bearing for said stem adjacent to the plane of said driving means adapted to maintain the axis of rotation in constant angular relation to the seat.

3. The combination with an engine cylinder having a ported valve seat, of a rotary disk valve engaging said seat, a stem for said valve passing centrally through said seat, driving means for said valve connected with the outer end of said stem, and an anti-friction journal bearing for said stem in substantial lateral alinement with said driving means and receiving the lateral thrust thereof.

4. The combination with an engine cylinder and a ported valve seat therefor, of a rotary valve engaging said seat, a stem for said valve passing through said seat, driving means, an anti-friction thrust bearing opposing movement of said valve away from its seat, and means of adjustment for the clearance between said valve and its seat.

5. The combination with an engine cylinder and a ported seat therefor, of a rotary disk valve engaging said seat, a stem for said valve passing through said seat, driving means for said stem, a thrust bearing for said stem opposing movement of said valve away from its seat, and means operable from the outer end of said stem for adjusting the clearance between said valve and its seat.

6. The combination with an engine cylinder and a ported seat therefor, of a rotary disk valve engaging said seat and subjected to the alternate pressure and suction of the cylinder, means for feeding lubricant between the valve and its seat, an anti friction thrust bearing for opposing movement of said valve away from its seat, and means coöperating with said thrust bearing for maintaining a limited clearance between the valve and its seat.

7. The combination with an engine cylinder and a ported valve seat therefor, of a rotary disk valve engaging said seat, a stem for said valve passing through said seat, a driver for said valve secured to the outer end of said stem, an anti-friction bearing for sustaining the radial and end thrust of said stem, and means coöperating with the end thrust bearing for limiting the clearance between the valve and its seat.

8. The combination with an engine cylinder and the head therefor, of a rotary disk valve seated on the inner face of said head, a stem for said valve passing centrally out through said head, an anti-friction journal bearing for the outer end of said stem seated in a recess in said head, a drive wheel mounted on said stem adjacent to said anti-friction bearing, an end thrust bearing for opposing movement of said valve from its seat, and means for adjusting the clearance between the valve and its seat.

9. The combination with an engine cylinder and the head thereof, of a rotary disk valve seated on the inner face of said head, a stem for said valve passing outward through said head, a radial and end thrust bearing for said stem in said head, a drive wheel mounted on said stem through which the end thrust is transmitted to said bearing, and means at the end of said stem for adjusting said drive wheel to limit the clearance between the valve and seat.

10. The combination with an engine cylinder having a ported seat, of a rotary valve engaging said seat, a stem for said valve passing centrally through said seat, a driving wheel for said valve connected with the outer end of said stem, and an anti-friction journal bearing for said stem, said driving wheel having its hub portion offset and said anti-friction bearing being positioned within said offset portion.

11. The combination with an engine cylinder having a ported valve seat, of a rotary disk valve engaging said seat, a stem for said valve, an anti-friction journal bearing for said stem, and a toothed gear wheel having its hub portion offset so that the gear teeth are in the plane of said bearing.

In testimony whereof I affix my signature in presence of two witnesses.

HOWARD E. COFFIN.

Witnesses:
LENA M. CARLE,
NINA L. BARSE.